(12) United States Patent
Laursen

(10) Patent No.: US 7,003,603 B2
(45) Date of Patent: Feb. 21, 2006

(54) PARTITIONED BACKPLANE SLOT TO COUPLE SWITCH FABRIC BLADES TO PORT BLADES

(75) Inventor: Soeren R. F. Laursen, Alleroed (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/833,497

(22) Filed: Apr. 27, 2004

(65) Prior Publication Data

US 2005/0060451 A1    Mar. 17, 2005

Related U.S. Application Data

(63) Continuation of application No. 09/586,341, filed on Jun. 2, 2000, now Pat. No. 6,728,807.

(51) Int. Cl.
*G06F 13/00* (2006.01)
(52) U.S. Cl. ............... 710/100; 370/357; 370/370; 370/419
(58) Field of Classification Search ........... 710/100, 710/107, 115, 121, 301; 370/357, 359, 370, 370/419; 712/33, 39
See application file for complete search history.

(56) References Cited

U.S. PATENT DOCUMENTS

| | | | | |
|---|---|---|---|---|
| 5,175,728 A | * | 12/1992 | Caplan et al. | 370/359 |
| 5,420,856 A | * | 5/1995 | Kerns | 370/359 |
| 5,617,547 A | * | 4/1997 | Feeney et al. | 710/316 |
| 5,983,260 A | * | 11/1999 | Hauser et al. | 709/201 |
| 6,035,414 A | * | 3/2000 | Okazawa et al. | 714/7 |
| 6,078,503 A | * | 6/2000 | Gallagher et al. | 361/725 |
| 6,105,088 A | * | 8/2000 | Pascale et al. | 710/100 |
| 6,154,449 A | * | 11/2000 | Rhodes et al. | 370/254 |
| 6,236,655 B1 | * | 5/2001 | Caldara et al. | 370/395.31 |
| 6,414,953 B1 | * | 7/2002 | Lamarche et al. | 370/359 |
| 6,611,526 B1 | * | 8/2003 | Chinnaswamy et al. | 370/406 |
| 6,748,474 B1 | * | 6/2004 | Caldara et al. | 710/301 |

* cited by examiner

*Primary Examiner*—John Pezzlo
*Assistant Examiner*—Dmitry Levitan
(74) *Attorney, Agent, or Firm*—Ted A. Crawford

(57) ABSTRACT

A network switch having a plurality of port blades, each port blade having a media port and an input and an output connection. The network switch includes a slot adapted to receive a first switch fabric blade in one of a plurality of positions. The first switch fabric blade is configured to receive a subset of the input connections and output connections from the port blades. Multiple switch fabric blades can be inserted into the slot to receive a different subset of the connections. In this manner, a low-cost modular network switch can be designed that can easily be scaled as bandwidth requirements increase.

8 Claims, 5 Drawing Sheets

PARTITIONED BACKPLANE SLOT TO COUPLE SWITCH FABRIC BLADES TO PORT BLADES

RELATED APPLICATIONS

This application is a continuation (and claims the benefit of priority under 35 USC 120) of U.S. application Ser. No. 09/586,341, filed Jun. 2, 2000 now U.S. Pat. No. 6,728,807. The disclosure of the prior application is considered part of (and is incorporated by reference in) the disclosure of this application.

BACKGROUND

This invention relates to network switching.

Telecommunications networks transfer audio, video, and other data by routing data from a source to a destination through a number of network switches. A conventional network switch includes a backplane with a number of expansion slots for receiving port blades and one or more switch fabric blades. Each port blade includes one or more media ports through which data is received and transmitted. The switch fabric blade(s) provides a high-speed switching mechanism to route data correctly between the port blades.

DESCRIPTION

Figure 1:
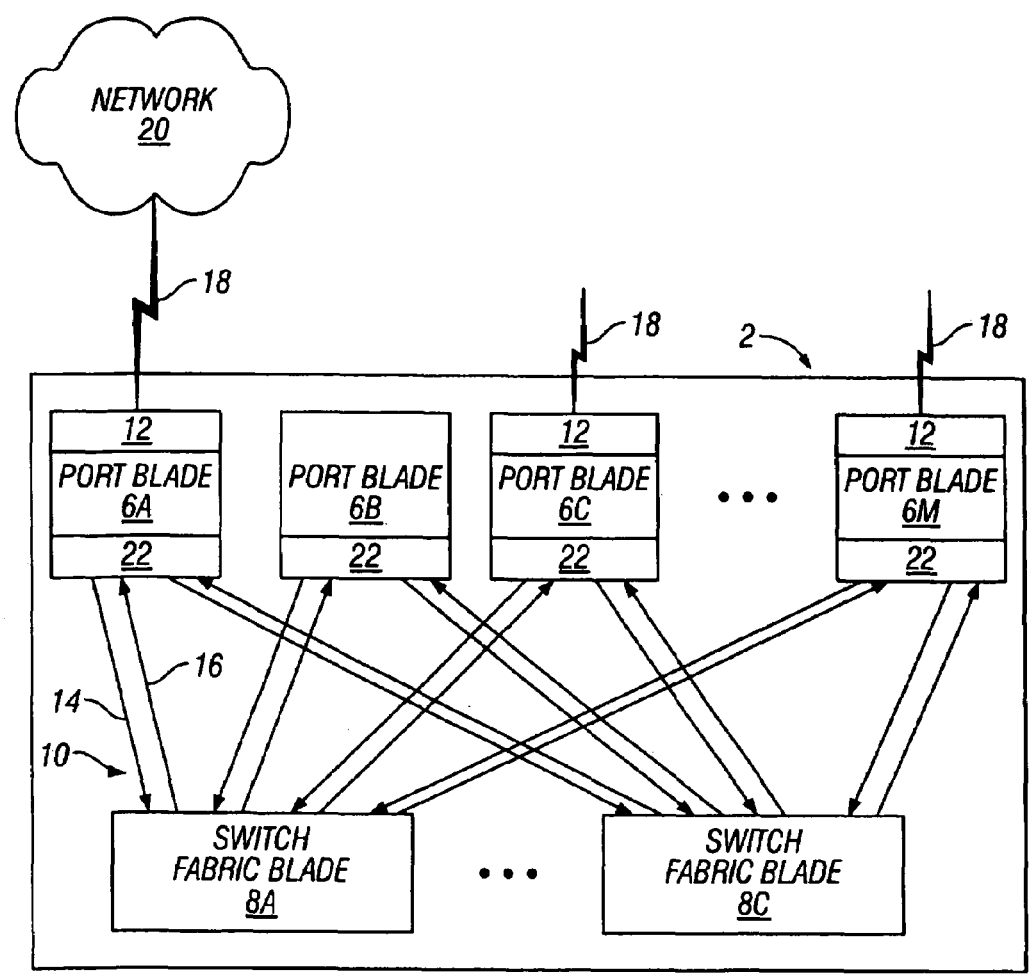
FIG. 1 is a block diagram illustrating a network switch having interconnected port blades and switch fabric blades.

FIG. 1 is a block diagram illustrating a network switch 2 in which backplane 10 provides a point-to-point connection between each port blade 6a through 6m and each switch fabric blade 8a through 8c. Network switch 2 includes a number of expansion slots 22, such as four or sixteen, for receiving and coupling a port blade 6 or a switch fabric blade 8 to backplane 10.

Several port blades 6 includes one or more media ports 12 for bi-directionally communicating via a corresponding external telecommunication link 18 to network 20, which may be a wide area network, a local area network or other digital network. Port blade 6b, also referred to as a processor blade, does not include a media port.

Each port blade 6 also includes an output connection 14 and an input connection 16 for communicating data with other port blades 6 via backplane 10 and switch fabric blades 8. Each switch fabric blade 8a through 8c provides a high-speed switching mechanism for routing data between port blades 6.

Figure 2:
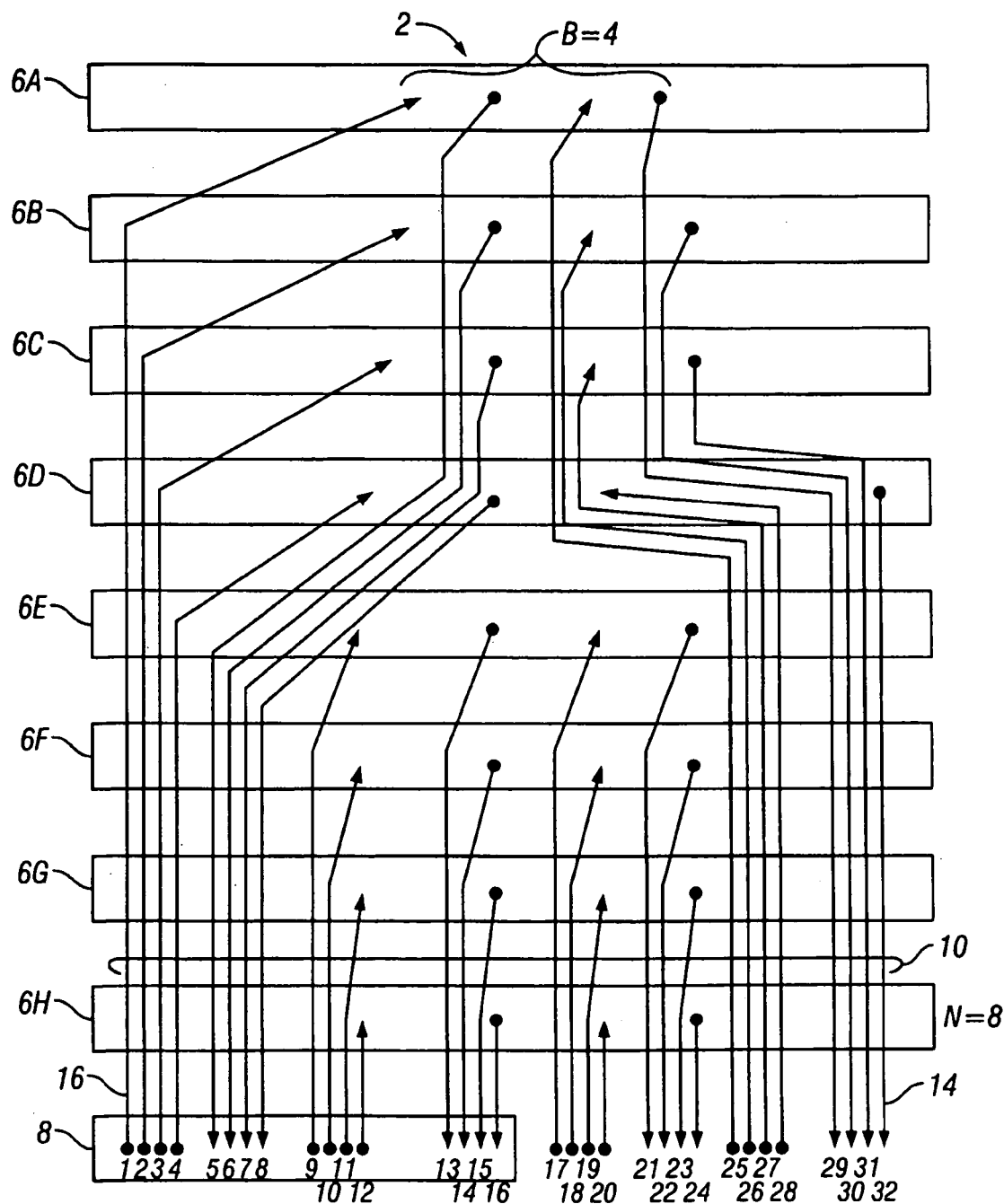
FIG. 2 is a block diagram illustrating one embodiment of network switch having a switch fabric blade in a first position.

FIG. 2 is a block diagram illustrating one embodiment of a wiring configuration for network switch 2. In the illustrated embodiment network switch 2 has nine slots for receiving up to eight port blades 6a through 6h and switch fabric blade 8.

Each port blade 6 has two output connections 14 and two input connections 16 for a total of thirty-two connections. Backplane 10 is configured to provide the input and output connections of port blades 6a through 6h to switch fabric blade 8 in groups of four. More specifically, backplane 10 provides the input and output connections from port blades 6 to pins within the switch fabric blades slot according to the following table:

TABLE 1

| Pins 1–4 | four input connections from port blades 6a through 6d |
|---|---|
| Pins 5–8 | four output connections from port blades 6a through 6d |
| Pins 9–12 | four input connections from port blades 6e through 6h |
| Pins 13–16 | four output connections from port blades 6e through 6h |
| Pins 17–20 | four input connections from port blades 6e through 6h |
| Pins 21–24 | four output connections from port blades 6e through 6h |
| Pins 25–28 | four input connections from port blades 6a through 6d |
| Pins 29–32 | four output connections from port blades 6a through 6d |

Switch fabric blade 8 occupies only a portion of one slot and is adapted to receive a subset of the input and output connections from port blades 6a through 6h. For example, in one configuration, switch fabric blade 8 is "half-width" such that it receives sixteen of the thirty-two input connections 12 and output connections 14 provided by port blades 6a through 6h.

As illustrated in FIG. 2, switch fabric blade 8 is physically inserted at a first position within a slot of network switch 2. In this configuration switch fabric blade 8 provides a point-to-point connection for all port blades 6a through 6h. In other words, switch fabric blade 8 receives input connections 16 and output connections 14 for all port blades 6a through 6h. Thus, all port blades 6a through 6h are enabled and can communicate via switch fabric blade 8 and backplane 10. However, switch fabric blade 8 provides port blades 6a through 6h with half their maximum bandwidth because only half of their input connections 16 and output connections 14 are connected.

Figure 3:
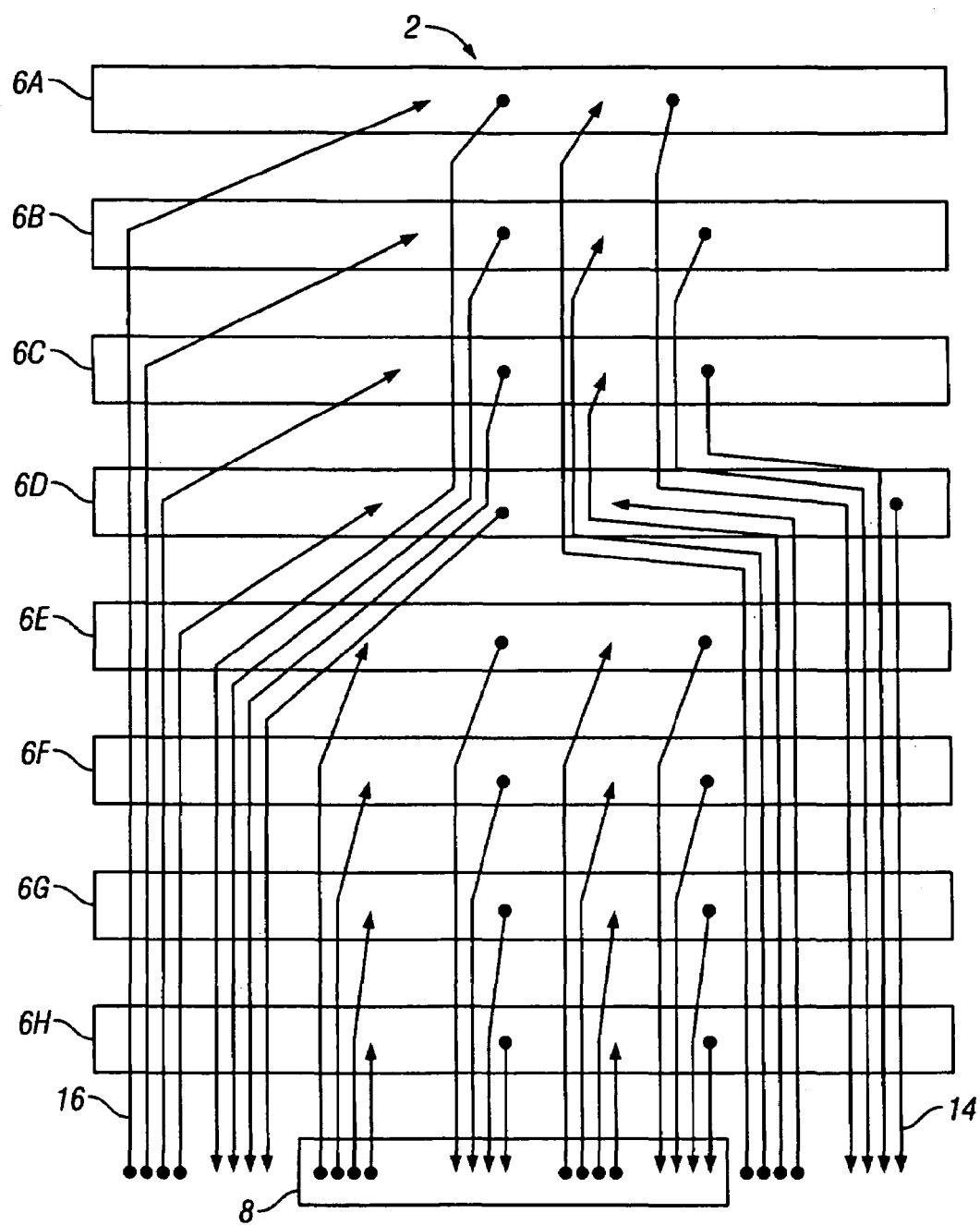
FIG. 3 is a block diagram illustrating one embodiment of network switch having a switch fabric blade in a second position.

FIG. 3 illustrates a half-width switch fabric blade 8 inserted into a second position within the slot. Physically, switch fabric blade 8 is inserted into a middle position within the slot provided by network switch 2. In this position, switch fabric blade 8 is coupled to all of the output connections 14 and input connections 16 of a subset of the port blades 6, notably, port blades 6e through 6h. Switch fabric blade 8, therefore, provides one half of the port blades 6 with their full bandwidth. The remaining port blades 6a through 6d are disabled.

Figure 4:
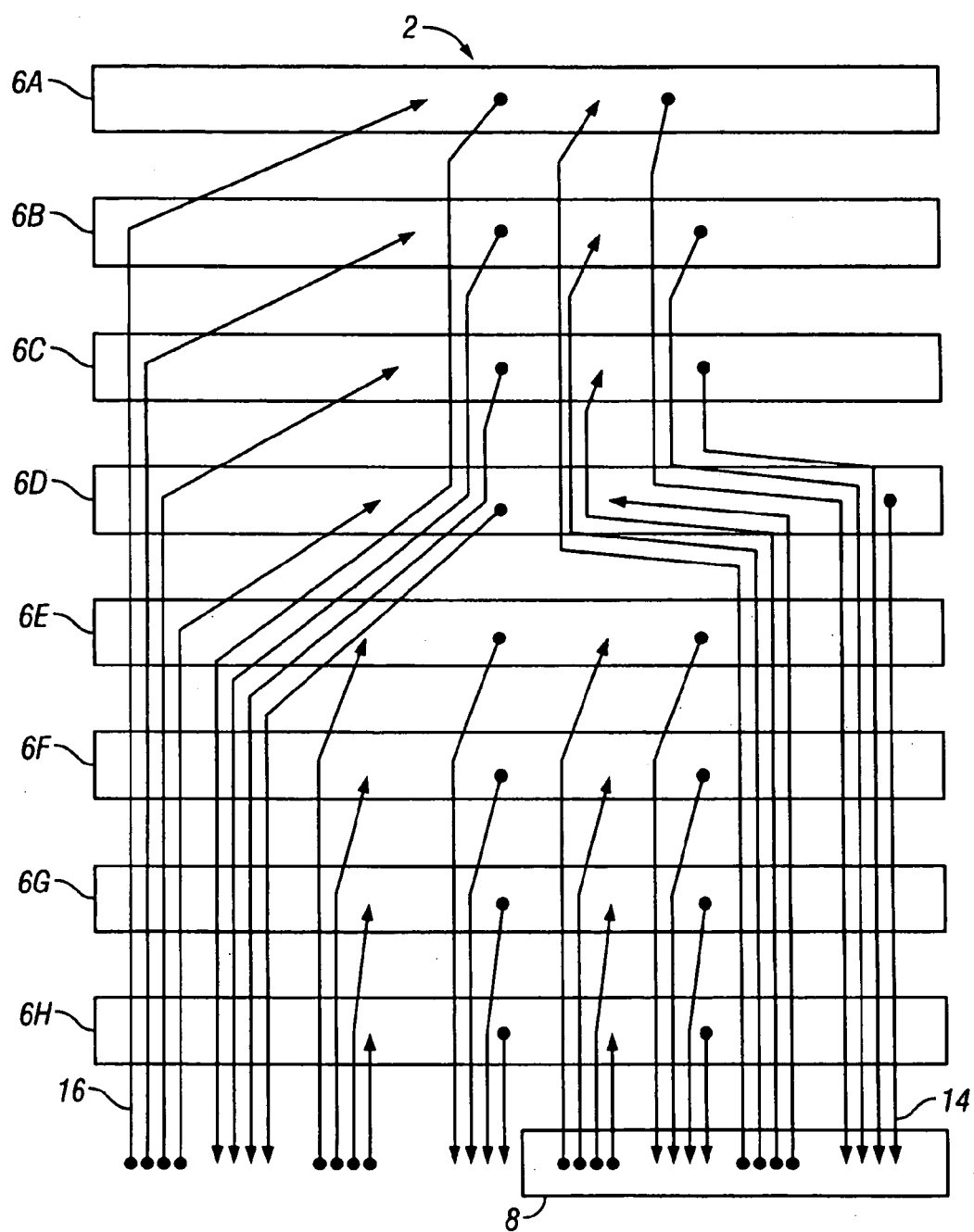
FIG. 4 is a block diagram illustrating one embodiment of network switch having a switch fabric blade in a third position.

FIG. 4 illustrates a half-width switch fabric blade 8 in a third position. In this position, switch fabric blade 8 again provides a point-to-point connection for all port blades 6a through 6h. As in the first position illustrated in FIG. 2, switch fabric blade 8 receives output connections 14 and input connections 16 from all of the port blades 6. However, only a subset of the connections are received from each port blade 6. In this manner, switch fabric blade 8 provides all port blades 6a through 6h with a specified bandwidth.

Figure 5:
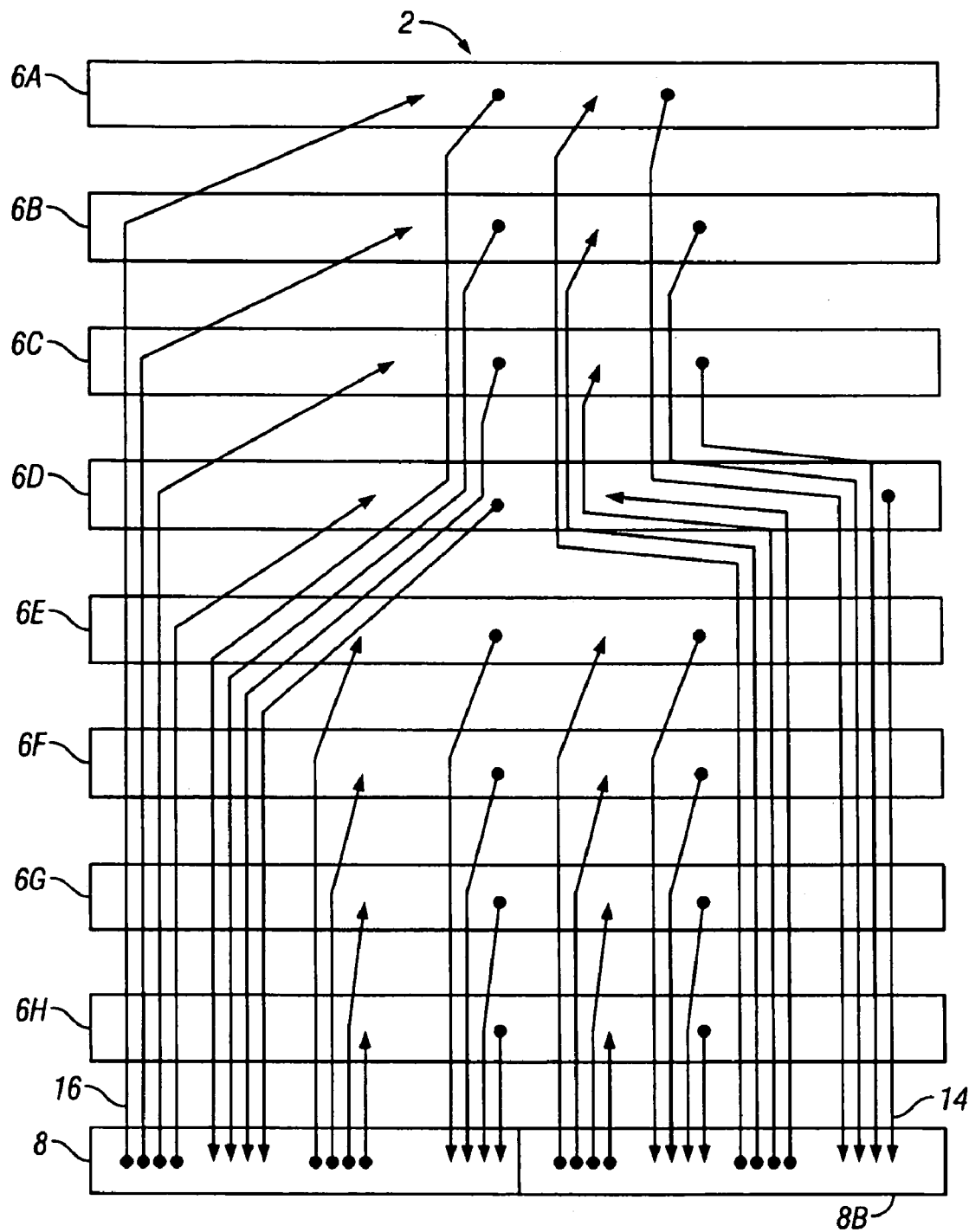
FIG. 5 is a block diagram illustrating one embodiment of network switch having two switch fabric blades sharing a single slot.

FIG. 5 illustrates network switch 2 having two half-width switch fabric blades 8a and 8b inserted into the first and third position, respectively. In this position, switch fabric blades 8a and 8b collectively receive all of the output connections 14 and input connections 16 of all port blades 6a through 6h. Thus, switch fabric blades 8a and 8b provide all port blades 6a through 6h with their full bandwidth.

FIGS. 2 through 5 illustrate network switch 2 receiving one or more switch fabric blades 8 within a single slot in order to control the bandwidth provided to each port blade. In this manner, a low-cost modular network switch can be designed that can easily be scaled as bandwidth requirements increase. This configuration can be extended to multiple switch fabric blades slots.

For example, each port blade has a bandwidth B representing the total number of input and output connections for the port blade where B equals four as shown in FIG. 2. For example, in FIG. 2, B equals four because each port blade 6 has a total of two output connections 14 and two input connections 16. For N port blades where N equals eight, each switch fabric blade 8 is configured to receive M inputs and outputs, where M is less than N*B, such as in FIG. 2 where M equals N*B/2.

Furthermore, the pins in the slot receiving the switch fabric blades are arranged such that in a first position, switch fabric blade 8 receives input and output connections from all of the port blades (FIG. 2). In a second position, switch fabric blade 8 receives all the input and output connections for a subset of the port blades 6 (FIG. 3). In a third position, switch fabric blade 8 receives input and output connections from all of the port blades 6 (FIG. 2). The first and third positions are physically separate within the slot and can be occupied by a first and second switch fabric blades such that all the input and output connections of the port blades are active.

Other embodiments are within the scope of the following claims.

What is claimed is:

1. A method comprising:
    partitioning a slot in a backplane of an information handling device into multiple locations;
    receiving into at least one of the partitioned locations of the slot a switch fabric blade; and
    receiving into another slot in the backplane a port blade, the port blade having at most a subset of inputs and outputs communicatively coupled with the switch fabric blade via point-to-point connections in the backplane.

2. The method of claim 1, the method further comprising:
    receiving into another partitioned location of the slot a second switch fabric blade, the second switch fabric blade communicatively coupled with a different subset of inputs and outputs of the port blade via other point-to-point connections in the backplane.

3. An information handling device comprising:
    a backplane including point-to-point connections;
    a slot within the backplane to receive a port blade, the port blade having a plurality of input and output connections; and
    another slot within the backplane, the other slot partitioned into multiple regions to receive and couple a switch fabric blade in communication with at most a subset of the input and output connections of a received port blade via a portion of the point-to-point connections in the backplane.

4. The information handling device of claim 3, wherein the other slot partitioned into multiple regions receives and couples multiple switch fabric blades in communication with all the input and output connections of the received port blade via another portion of the point-to-point connections in the backplane.

5. An information handling device comprising:
    a plurality of slots, each to receive input and output connections of a port blade;
    a switch fabric slot to receive a switch fabric blade in one of multiple regions of the switch fabric slot; and
    a backplane including point-to-point connections to interconnect pins in the multiple regions of the switch fabric slot to input and output connections of a port blade received and coupled to one of the plurality of slots.

6. The information handling device of claim 5, wherein a first subset of point-to-point connections interconnect pins in a first region of the switch fabric slot to a first subset of the input and output connections of a port blade received and coupled to one of the plurality of slots.

7. The information handling device of claim 6, wherein a second subset of point-to-point connections interconnect pins in a second region of the switch fabric slot to a second portion of input and output connections of the port blade received and coupled to one of the plurality of slots, the second portion different from the first portion.

8. The information handling device of claim 7, wherein a third subset of point-to-point connections interconnect pins in a third region of the switch fabric slot to all of the input and output connections of a port blade coupled and received to a subset of the plurality of slots.

* * * * *